Figures 1, 2:
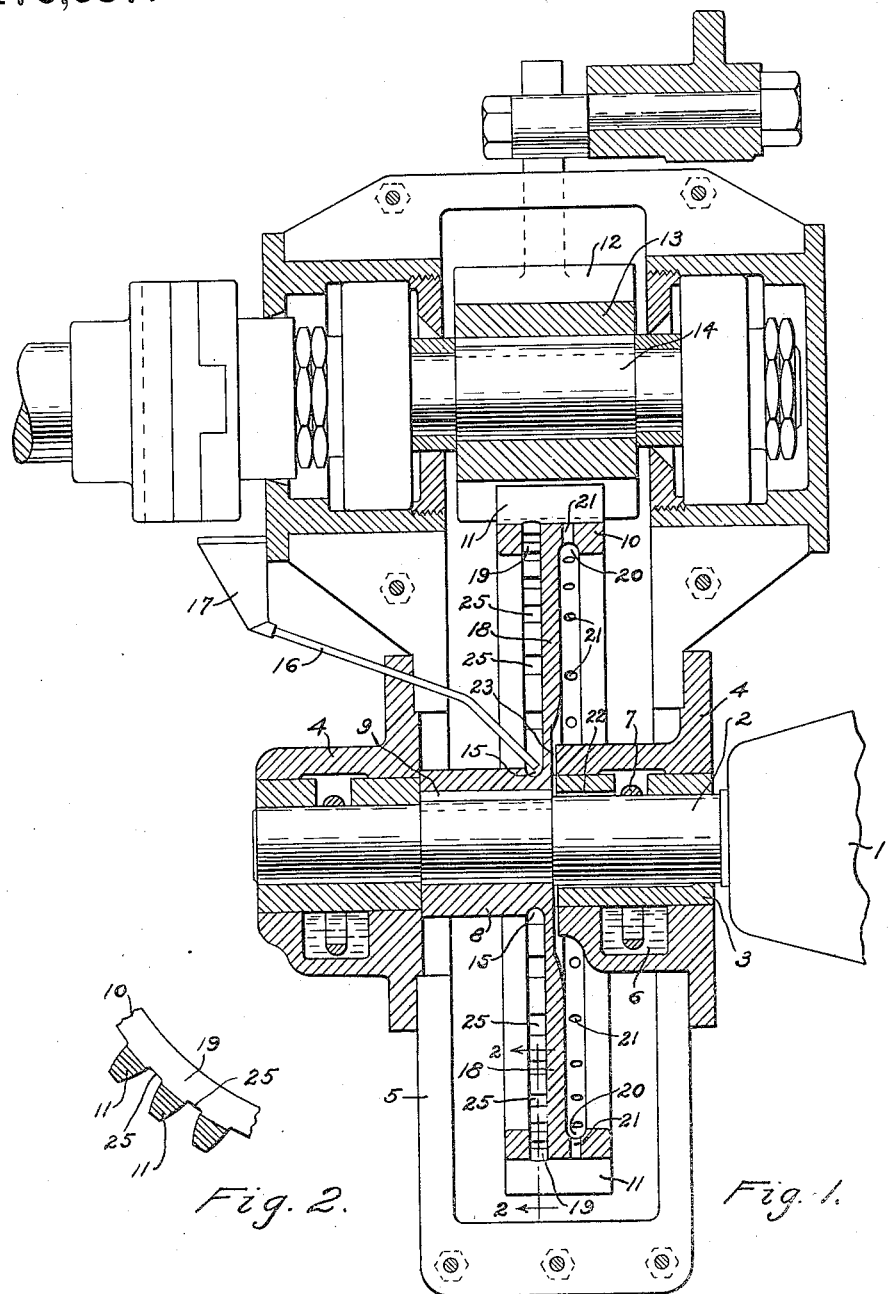

W. C. FARNUM.
CENTRIFUGAL LUBRICATING GEAR.
APPLICATION FILED APR. 16, 1915.

1,170,057.

Patented Feb. 1, 1916.

WITNESSES.

INVENTOR.
William C. Farnum
BY
ATTORNEY.

UNITED STATES PATENT OFFICE.

WILLIAM C. FARNUM, OF WINCHENDON, MASSACHUSETTS, ASSIGNOR OF ONE-HALF TO WILLIAM M. WHITNEY, OF WINCHENDON, MASSACHUSETTS.

CENTRIFUGAL-LUBRICATING GEAR.

1,170,057. Specification of Letters Patent. Patented Feb. 1, 1916.

Application filed April 16, 1915. Serial No. 21,914.

*To all whom it may concern:*

Be it known that I, WILLIAM C. FARNUM, a citizen of the United States, residing at Winchendon, county of Worcester, and State of Massachusetts, have invented an Improvement in Centrifugal-Lubricating Gears, of which the following description, in connection with the accompanying drawings, is a specification, like letters on the drawings representing like parts.

The invention to be hereinafter described relates to rotary machine elements having teeth for the transmission of power, and more particularly to gear wheels and the like.

As well understood by those skilled in the art, the frictional engagement of gear teeth with the associated driving or driven part causes rapid wear of the engaging surfaces, which, in the case of two interengaging gear wheels, rapidly produces objectionable back lash or play, and, in the case of a sprocket gear and chain, produces such loose engagement of the parts that proper transmission of power is seriously impaired. Attempts have heretofore been made to supply a lubricant to the teeth of the gear by immersing a part of the gear periphery in oil. This is objectionable in most cases, and is possible only under certain conditions. Other attempts have provided oil or grease cups with an adjusting plunger which could be manipulated from time to time to force the desired lubricant to the gear teeth through suitable conduits. This periodical application of the lubricant is open to the objection that it requires the attention of an operative from time to time and he may neglect to manipulate the device. Still other efforts have been directed to the same end, but so far as I am aware, they have only been partially successful and are open to objections inherent in each case.

With these facts in mind, the aims and purposes of the present invention are to provide means whereby the teeth of a gear wheel shall have supplied to them automatically and continually during the operation, a lubricant in proportion to the demands of speed.

In carrying the invention into effect, centrifugal force has been utilized to carry the lubricant to the surfaces to be lubricated, and since such force varies according to the speed of the wheel, the amount of lubricant supplied is automatically controlled in proportion to the speed, all of which will hereinafter more fully appear from the following description and accompanying drawings of one good, practical form of the invention.

In the drawings:—Figure 1 is a sectional view showing the present invention employed in connection with a driving mechanism for planers, such as described and claimed in my prior application, Serial No. 836,430, filed May 5, 1914, to which reference may be had; and Fig. 2 is a detached sectional detail on line 2—2, Fig. 1.

In explaining the present invention and making clear the characteristics thereof, it is herein shown as embodied in the gear driving mechanism for planers which form the subject-matter of my prior application, Serial No. 836,430, filed May 5, 1914; but it is to be understood that this association of the invention is merely for convenience of description, and that it may be employed in other relations with good practical results.

The part 1 in Fig. 1 may typify a motor, such as that referred to in the prior application and from the motor 1 may extend the shaft 2 on which are the bushings 3 for externally supporting the bearings 4 of the floating casing 5, substantially as in said prior application. The bearings 4 may conveniently be provided with chambers 6 for a suitable lubricant and a ring 7 may be employed for carrying the lubricant about the shaft 2, substantially as well understood in the art, and as clearly shown and described in connection with the said prior application.

Mounted between the bearings 4 of the floating casing is the power transmitting gear having a hub 8 preferably secured to the shaft 2 by a spline 9 or similar device. At its peripheral portion the gear is provided with a flange 10, the outer portion of which is provided with a series of teeth 11, which are adapted to engage the teeth 12 on a gear 13 splined to the shaft 14. The shaft 14, as well as the two gears thus far generally described, may be properly supported and inclosed within the floating casing 5, all substantially as pointed out in said prior application.

When rotary elements, such as the gears described, are employed for transmitting power, the frictional engagement of the gear teeth soon causes excessive wear, and eventually back lash or play. This is particularly noticeable where the teeth of intermeshing gears are not properly supplied with a lubricant, and it is also noticeable under the same conditions with respect to sprocket wheels and sprocket chains. It is within the contemplation of the present invention that such rotary elements as gear wheels, sprocket wheels, and the like, shall be so constructed that a lubricant may be supplied to the engaging surfaces of the driving and driven elements through the action of centrifugal force, produced in the rotative movement of such elements.

In the disclosed embodiment of the present invention, the gear wheel mounted upon the shaft 2 has its hub 8 provided with an annular reservoir 15, preferably formed as a groove into which a supply of lubricant may be introduced through a spout 16 leading from a cup or holder 17, the construction being such that the lubricant will flow in the desired quantities from the holder 17 to the reservoir or annular groove 15 in the hub 8 of the gear. Extending outward from the hub 8 is the web 18 connecting the hub and the flange 10, and formed on the inner portion or surface of the flange 10 are the grooves 19 and 20, preferably one on each side of the web 18. In some cases, however, one groove will be sufficient. One of these grooves thus formed on the inner portion of the flange 10, such as the groove 20, has the openings 21 extending therefrom to the spaces between the teeth 11 of the gear; and in order that a proper lubricant may be supplied to the open groove 20, the gear itself may have applied to its hub portion, a lubricant from a convenient source of supply. In the present form of the invention this lubricant is preferably furnished from the chamber 6 through a small channel-way or duct 22 between the bushing 3 and the shaft 2. The lubricant passing through the channel-way or duct 22 to the hub of the gear will, upon reaching such hub, enter a passageway 23 leading radially from the hub axis, and upon rotation of the gear, the lubricant will pass by centrifugal action along the face of the web 18 into the open groove 20 and from there be thrown through the perforations or openings 21 leading to the outer portion of the flange 10 between the gear teeth 11.

In some cases it is desirable to make the groove sufficiently deep to intersect the base portions of the teeth of the gear, and also the open space between the gear teeth, substantially as indicated in Fig. 2, wherein the groove 19 in the flange 10 is shown as extending to the bottom of the teeth 11 and intersecting the base portions of the teeth and also the spaces 25 between the teeth, the construction being such that upon rotation of the gear, the lubricant deposited in the open reservoir or groove 15 at the hub of the gear will be thrown outward by centrifugal force over the face of the web 18 and be received into the open groove 19, whence, by centrifugal action and circumferential movement of the lubricant in the groove 19, it will pass into the spaces between the gear teeth 11. The groove 19 in the under portion of the flange 10 may be formed either at the time the gear is constructed, or may be cut therein; but in any event, the depth of the groove 19 is such that it intersects the base portions of the teeth 11 and the spaces 25 between the teeth.

It will be noted that the open groove or reservoir 15 at the hub of the gear permits the lubricant to pass at once in a radial direction toward the groove 19 in the under portion of the flange 10 under the action of centrifugal force, as the gear is rotated, and that such lubricant will be delivered in proper quantities into the spaces between the gear teeth, dependent upon the speed of rotation of the gear. The greater speed, and consequently the frictional engagement of the driving and driven gears, the greater will also be the supply of lubricant to the engaging surfaces between the gears.

While the single gear in the present illustration of the invention is shown as provided with the two open lubricant receiving grooves 19 and 20, it is evident that in some cases one of these may be sufficient, and that different means may be provided for delivering to the hub portion of the gear the lubricant desired; but in any event, the present invention contemplates that the supply of lubricant through the flange of the gear to the teeth beyond shall be under the control of centrifugal force, and that it shall be delivered to the teeth in proportion to the demands incident to the gear speed.

While the present invention has been shown as applied to a gear driving mechanism for planers, such as that described in said prior application, it is to be understood that it may be applied to any gear or sprocket wheel for transmitting motion.

What is claimed is:—

1. A gear wheel having a hub provided with a lubricant reservoir, and a flange portion having peripheral teeth, and a web connecting the hub and flange portion, said flange portion having a lubricant receiving groove formed on its inner surface to receive a lubricant thrown from the hub reservoir by centrifugal force as the gear rotates, and communicating with the spaces between the teeth of the gear.

2. A gear wheel having a hub provided with a groove to hold a lubricant, a web extending from the hub and over which the lubricant may be thrown radially by centrifugal force as the gear rotates, a flange mounted on said web and having a series of teeth on one side and a lubricant receiving groove on the opposite side in communication with the spaces between the teeth to deliver lubricant thereto by centrifugal action as the gear is rotated.

3. A gear wheel having a hub, means for delivering a lubricant to said hub, a web extending from said hub and over the surface of which the lubricant delivered to the hub may be moved by centrifugal action as the gear is rotated, a flange having gear teeth on its outer portion and a circumferential groove on its inner portion intersecting the spaces between the gear teeth to direct lubricant thrown radially of the hub to the gear teeth as the gear is rotated.

In testimony whereof, I have signed my name to this specification, in the presence of two subscribing witnesses.

WILLIAM C. FARNUM.

Witnesses:
    FREDERICK F. DAVIS,
    N. W. COOMBS.